United States Patent Office 3,578,603
Patented May 11, 1971

3,578,603
PROCESS FOR THE PREPARATION OF PHOSPHATE PHOSPHORS
Ernest A. Dale, Hamilton, Richard A. Fowler, Danvers, and Martha J. B. Thomas, Winchester, Mass., assignors to Sylvania Electric Products Inc.
No Drawing. Filed Mar. 20, 1969, Ser. No. 809,037
Int. Cl. C09k 1/36
U.S. Cl. 252—301.4                                   3 Claims

ABSTRACT OF THE DISCLOSURE

A process of making calcium phosphate-type phosphors including the use of vaterite form of calcium carbonate as one of the starting materials.

---

The invention relates to the preparation of extremely high purity calcium carbonate having a thermally dynamical meta-stable crystal structure and the use of such crystal structures of calcium carbonate for the production of luminescent materials. Specifically, this invention relates to the preparation of the vaterite form of calcium carbonate and its use as a raw material in the preparation of high brightness phosphors.

The use of calcium carbonate of high purity for the preparation of phosphors is well known to the art and processes have been developed for the preparation of such materials. Calcium carbonate is used in fairly high percentages, frequently as much as twenty percent by weight, of the formulation of raw materials for calcium halophosphate phosphors and hence, is the second largest constituent. Using the highly reactive vaterite crystal structure, solid state reactions between the raw materials can be enhanced and the brightness of the phosphor thus improved.

Ordinarily, it would appear that the vaterite form of the calcium carbonate should not be used as a raw material for calcium phosphate-type phosphors, since it is known to be a scavenger of cations which are deleterious to the product. For example, the vaterite form can entrap sodium atoms during its preparation which are particularly deleterious to fluorescent phosphors because they quench the brightness. Moreover, the vaterite form has tended to be unstable and can shift to the calcite form upon standing. Hence, the use of the vaterite form calcium carbonate for raw materials in phosphor preparation would not be expected to be particularly advantageous.

According to our invention, we have discovered a method of preparing vaterite of high purity with improved physical stability and hence, produce a phosphor of enhanced brightness when the material is used in the blend with other raw materials.

Commonly, calcium carbonate is prepared by reacting calcium chloride with diammonium carbonate to produce calcium carbonate and ammonium chloride. We have discovered that in order to insure the formation of high purity calcium carbonate with a stable vaterite structure, the raw materials for the manufacture must be prepared in a certain manner. Special precaution must be taken to insure that sodium does not enter into the ingredients of the mix. We mix a solution of a high purity, soluble calcium salt, preferably calcium chloride or calcium nitrate, together with a solution of a non-alkaline metal, high purity, soluble carbonate salts, preferably ammonium carbonate or ammonium bicarbonate. When mixed, the pH is maintained above 8.5. If the pH of the solutions goes below that figure, the calcite crystal structure forms preferentially and a pure vaterite cannot be produced. The vaterite precipitates from the solution and is removed from the mother liquor promptly and dried. The drying temperature must be maintained below about 250° F. or again the vaterite will convert to calcite. When thus prepared, the vaterite of our invention is quite stable and can be stored without converting.

After reaction to form the vaterite, it is mixed with the desired amount of calcium phosphate necessary to form the calcium phosphate-type phosphors and whatever activators are required, and fired according to conventional techniques to produce the phosphor.

When using vaterite as the source of calcium in a typical calcium halophosphate phosphor, activated by Sb and Mn and using $CaP_2O_7$ as the basic raw material, gains in brightness are realized as indicated in Table I.

TABLE I $CaCO_3$ sources:                          100 hours lumen gain
  Sample A (vaterite), Sample B (calcite) _____ +45
  Sample C (vaterite), Sample D (calcite) _____ +70
  Sample E (vaterite), Sample D (calcite) _____ +36
  Sample F (vaterite), Sample D (calcite) _____ +36

When the vaterite form is used in conjunction with $CaHPO_4$ as the basic raw material, similar advantages are evidenced.

TABLE II $CaCO_3$ sources:                          100 hours lumen gain
  Sample G (vaterite), Sample D (calcite) ____ +176
  Sample H (vaterite), Sample D (calcite) ___ +70

It is apparent that the vaterite form of calcium carbonate produces beneficial gains in calcium phosphate-type phosphors. We believe that the vaterite structure undergoes a crystal structure transition at the point where the solid state formation of the phosphor crystal structure begins, thus a highly reactive material freshly formed is present to increase the efficiency of the solid state reaction.

The following specific example is offered for further illustration of our invention but is not intended to be limitative upon the claims.

Commercially pure calcium carbonate is dissolved in hydrochloric acid and the solution pH is adjusted to 6 using ammonium hydroxide and then treated with a small quantity of ammonium polysulfide to precipitate heavy metals. The solution is then filtered and hydrogen peroxide is added to oxidize $S^{-2}$ to $X^0$ which is removed by filtration. The purified solution of calcium is adjusted with de-ionized water to a specific gravity of 1.104 (1.2 molar) and a pH of 9.9 with ammonium hydroxide.

Ammonium carbonate, another ingredient for the process, is prepared by bubbling ammonia and carbon dioxide gases into water. A solution having a specific gravity of 1.048 and a pH of 9.9 is obtained.

The solutions are reacted at room temperature, the pH of the slurry being between 9.2 and 9.4. A volume of approximately 30 gallons of slurry is allowed to build up and then is removed to a holding tank. From the latter tank, the precipitate is centrifuged and washed. A washed cake is produced which is oven dried at about 220° F. for eight hours and then seived.

The vaterite form of calcium carbonate which is produced can then be used as a raw material in phosphor production. For example, to make a calcium halophosphate phosphor 12 grams of calcium pyrophosphate are mixed with 4 grams of vaterite, 1 gram calcium fluoride, .4 gram ammonium chloride, .4 gram manganese carbonate, .4 gram antimony oxide and .3 gram cadmium oxide. The ingredients are fired according to the teachings of the Homer et al. Pat. 3,002,933. In order to make a calcium zinc orthophosphate phosphor, 270 grams of calcium orthophosphate are mixed with 65 grams of calcium carbonate, 0.1 gram of ammonium chloride, 1.3 grams of stannic oxide and 15.0 grams of zinc oxide. The material is then fired for 4 hours according to conventional techniques at 2100° F. and 2 hours in a reducing atmosphere at 1800° F.

It is apparent that modifications and changes may be made within the spirit and scope of the instant invention, but it is our intention only to be limited by the spirit and scope of the appended claims.

As our invention, we claim:

1. In the process of making a calcium phosphate phosphor, the steps which comprise: mixing together ingredients necessary to form said phosphor including the vaterite form of calcium carbonate in an amount sufficient to produce enhanced luminescence of the phosphor; firing said materials and recovering a calcium phosphate type phosphor.

2. The process according to claim 1 wherein the phosphor is calcium halophosphate type.

3. The process according to claim 1 wherein the phosphor is either a calcium orthophosphate or a modified calcium orthophosphate type.

References Cited

UNITED STATES PATENTS

| | | | |
|---|---|---|---|
| 3,099,627 | 7/1963 | Mooney et al. | 252—301.4 |
| 3,321,269 | 5/1967 | Yasui et al. | 23—66 |

ROBERT D. EDMONDS, Primary Examiner